United States Patent
Lin

(10) Patent No.: US 7,526,721 B2
(45) Date of Patent: Apr. 28, 2009

(54) CHARACTER INPUT SYSTEM CAPABLE OF ADJUSTING A CHARACTER SETTING CORRESPONDING TO AN INPUT DEVICE AND METHOD THEREOF

(75) Inventor: Zong-Liang Lin, Taipei (TW)

(73) Assignee: Lite-On Technology Corp., Neihu, Taipei (TW)

( * ) Notice: Subject to any disclaimer, the term of this patent is extended or adjusted under 35 U.S.C. 154(b) by 539 days.

(21) Appl. No.: 11/161,201

(22) Filed: Jul. 26, 2005

(65) Prior Publication Data

US 2006/0285906 A1    Dec. 21, 2006

(30) Foreign Application Priority Data

Jun. 20, 2005    (TW) ............... 94120453 A

(51) Int. Cl.
*G06F 17/00* (2006.01)
(52) U.S. Cl. ............... 715/256; 715/264; 715/265
(58) Field of Classification Search ......... 715/255–256, 715/264–265, 530, 531, 536
See application file for complete search history.

(56) References Cited

U.S. PATENT DOCUMENTS

| 4,130,882 | A | * | 12/1978 | Swanstrom et al. | ............ 704/8 |
| 5,623,682 | A | * | 4/1997 | Fukunaga | ............ 715/210 |
| 5,634,134 | A | * | 5/1997 | Kumai et al. | ............ 715/223 |
| 5,644,728 | A | * | 7/1997 | Pillans | ............ 705/43 |
| 6,182,099 | B1 | * | 1/2001 | Nakasato | ............ 715/236 |
| 2003/0021409 | A1 | * | 1/2003 | Incarnato et al. | ............ 380/28 |
| 2004/0100495 | A1 | * | 5/2004 | Brockway | ............ 345/747 |

FOREIGN PATENT DOCUMENTS

TW    M25024 U    11/2004

* cited by examiner

*Primary Examiner*—Thu Huynh
(74) *Attorney, Agent, or Firm*—Winston Hsu

(57) ABSTRACT

A character input system capable of adjusting a character setting corresponding to an input device and a method thereof are disclosed. The input device includes a plurality of input components corresponding to a default character setting. An input component from the input components is utilized for indicating an input of a first character according to the default character setting. The method includes converting the default character setting into a specific character setting; and determining that the input component indicates an input of a second character according to the specific character setting.

15 Claims, 4 Drawing Sheets

| Numeral character | 0 | 1 | 2 | 3 | 4 | 5 | 6 | 7 | 8 | 9 |
|---|---|---|---|---|---|---|---|---|---|---|
| Scan code | 11h | 23h | d3h | 3dh | 74h | b1h | 5fh | 4eh | 88h | 9fh |
| Numeral character | 8 | 1 | 4 | 0 | 7 | 2 | 6 | 9 | 5 | 3 |

CharSet 1 = {Numeral character (top), Scan code}
CharSet 2 = {Scan code, Numeral character (bottom)}

Fig. 3

CHARACTER INPUT SYSTEM CAPABLE OF ADJUSTING A CHARACTER SETTING CORRESPONDING TO AN INPUT DEVICE AND METHOD THEREOF

BACKGROUND OF THE INVENTION

1. Field of the Invention

The present invention relates to a character input system and a related method, and more specifically, to a character input system capable of adjusting a character setting corresponding to an input device and a method thereof.

2. Description of the Prior Art

In modern life, people usually withdraw money by inserting a debit card or a credit card into an automatic teller machine (an ATM) and then inputting a password. The advantage of utilizing the above-mentioned ATM is convenience; however, such machines provide thieves with an opportunity to steal people's passwords in order to access their accounts. The perpetrators usually steal a person's password by placing a film on a keyboard of an ATM to obtain the last numbers the person has pressed, or by utilizing a hidden camera to record the process of the person inputting their password. The perpetrators can then withdraw the person's money using a stolen or a fake ATM card. As carrying out such methods can be accomplished with very simple devices, the rate of such crimes at ATMs is increasing.

The latest ATMs have anti-recording monitors, but their effectiveness on protecting passwords from being leaked is limited. In consideration of these factors, how to effectively prevent a password from being stolen becomes an important security issue.

SUMMARY OF THE INVENTION

One of the objectives of the claimed invention is therefore to provide a character input system capable of adjusting a character setting corresponding to an input device and a method thereof, in order to solve the above-mentioned problem.

According to the claimed invention, a method for adjusting a character setting corresponding to an input device is disclosed. The input device comprises a plurality of input components corresponding to a default character setting. An input component from the input components is utilized for indicating an input of a first character according to the default character setting. The method comprises converting the default character setting into a specific character setting; and determining that the input component indicates an input of a second character according to the specific character setting.

In addition, the claimed invention provides a character input system. The character input system comprises an input device, comprising a plurality of input components corresponding to a default character setting, wherein an input component from the input components is utilized for indicating an input of a first character according to the default character setting. The character input system also comprises a calculation unit, coupled to the input device, for converting the default character setting to a specific character setting, and determining that the input component indicates an input of a second character according to the specific character setting.

The claimed invention provides a character input system capable of adjusting a character setting corresponding to an input device and a method thereof. The character input system and the method can be applied to an input device which needs to prevent confidential data (i.e., passwords) from being leaked, or is capable of replacing arrangements of keys, or allowing users to define personal arrangements of the keys, such as a keyboard of an ATM or a burglarproof device. In the character input system, a calculation unit converts a default character setting into a specific character setting using a randomizing method. In this way, every time the default character setting is converted into a specific character setting, the content of the generated specific character setting is different from before. Therefore, when a user inputs a password, even if a perpetrator records the positions of keys pressed by the user, the perpetrator cannot obtain the password inputted by the user. In addition, according to the present invention, the user does not need to carry out additional operations, such as memorizing an additional password, and the character input system does not require any additional hardware devices to be added, so costs can be reduced.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram of a mapping table according to the present invention.

DETAILED DESCRIPTION

Figure 1:
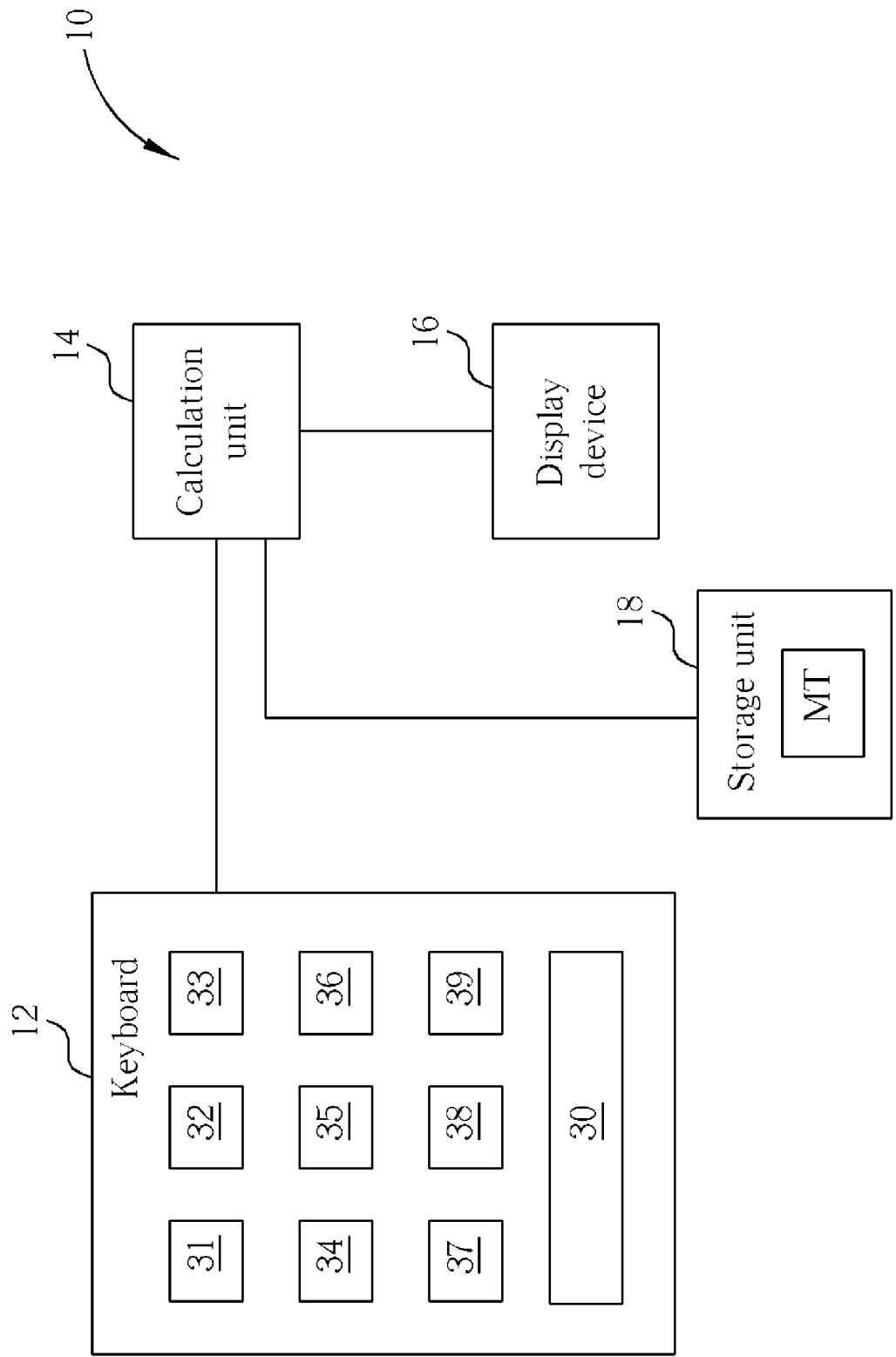
FIG. 1 is a functional block diagram of an embodiment of a character input system according to the present invention.
Figure 2:
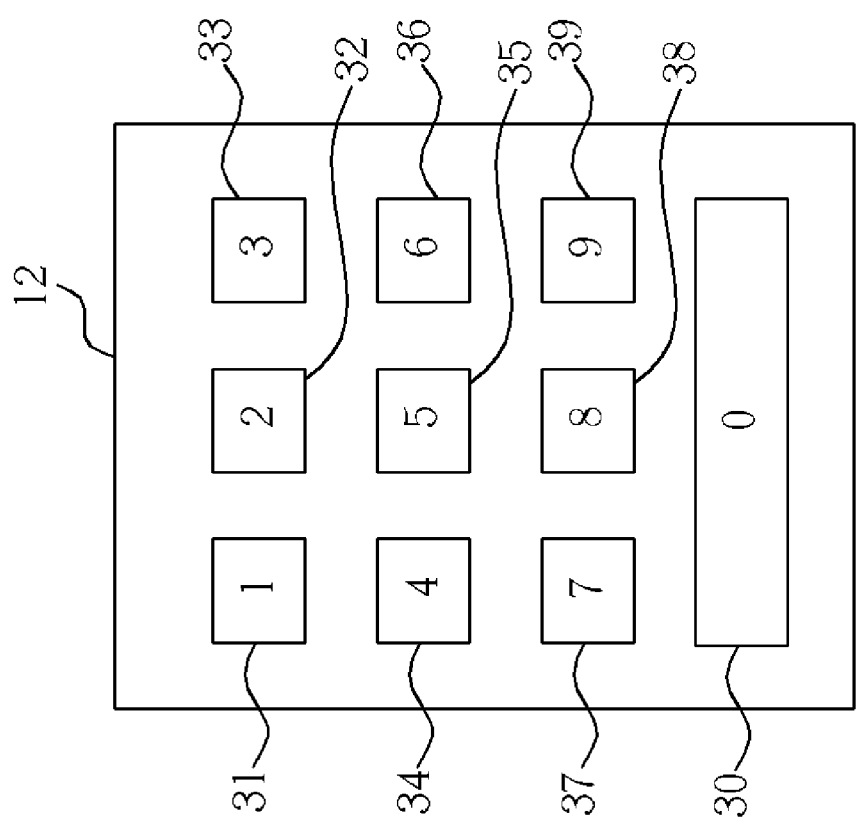
FIG. 2 is a diagram of a default character setting according to the present invention.

Please refer to FIG. 1. FIG. 1 is a functional block diagram of an embodiment of a character input system 10 according to the present invention. In the present embodiment, the character input system 10 is utilized for adjusting a character setting corresponding to a keyboard of an ATM. It should be noted that the character input system 10 is not limited to be applied in an ATM. As shown in FIG. 1, the character input system 10 comprises a keyboard 12, a calculation unit 14, a display device 16 and a storage unit 18. The keyboard 12, the display device 16 and the storage unit 18 are respectively coupled to the calculation unit 14. The keyboard 12 comprises a plurality of keys 30~39. In the present embodiment, the keys 30~39 respectively correspond to scan codes 11h, 23h, d3h, 3dh, 74h, b1h, 5fh, 4eh, 88h and 9fh. In a common situation, the calculation unit 14 sets the keyboard 12 to correspond to a default character setting CharSet1; meaning that the calculation unit 14 sets the keys 30~39 to indicate inputs of corresponding numeral characters "0", "1", "2", "3", "4", "5", "6", "7", "8" and "9", respectively, according to the default character setting CharSet1. Relations between the scan codes 11h, 23h, d3h, 3dh, 74h, b1h, 5fh, 4eh, 88h, 9fh and the numeral characters "0", "1", "2", "3", "4", "5", "6", "7", "8", default character setting CharSet1. At this time, the scan codes 11h, 23h, d3h, 3dh, 74h, b1h, 5fh, 4eh, 88h, 9fh (the keys 30~39) respectively correspond to the numeral characters "0", "1", "2", "3", "4", "5", "6", "7", "8", "9". The default character setting CharSet1 can be presented to a user in several ways. Please refer to FIG. 2. FIG. 2 is a diagram of the default character setting CharSet1 according to the present invention. For example, the numeral characters "0", "1", "2", "3", "4", "5", "6", "7", "8", "9" can be displayed on the keys 30~39 of the keyboard 12 by printing the numeral characters "0", "1", "2", "3", "4", "5", "6", "7", "8", "9" on the surfaces of the keys 30~39. As shown in FIG. 1 and FIG. 2, presently the key 35 indicates an input of a numeral character "5" according to the default character setting CharSet1. In other words, if a user wants to input the numeral character "5", they need to press the key 35. In the present embodiment, the numeral characters are displayed on the corresponding keys 30~39 of the keyboard 12 according to the default character setting CharSet1. In other embodiments, however, the calculation unit 14 according to the present invention can also control the display device 16 (i.e., a monitor) to display the default character setting CharSet1. Alternatively, in another embodiment, the keyboard 12 can display characters according to a present character setting, meaning that the keyboard 12 can be integrated with the display device 16; for example, each key 30~39 of the keyboard 12 comprises a small-sized liquid crystal display (LCD) on it for displaying a corresponding numeral character. The storage unit 16 is utilized for storing a mapping table MT. The calculation unit 14 records the default character setting CharSet1 into the mapping table MT. The detailed descriptions of the calculation unit 14 and the mapping table MT are included in the following paragraph. Please note that according to the present invention, scan codes are not limited to the scan codes utilized in the present embodiment and can be other scan codes. Similarly, characters that will be shown are not limited to the numeral characters in the present embodiment and can be other characters.

At present, if the user wants to input a numeral string, "2", "5", "8", "9", they need to press the keys 32, 35, 38, and 39 sequentially. The calculation unit 14 then receives the scan codes, d3h, b1h, 88h, 9fh, respectively corresponding to the keys 32, 35, 38, 39. Afterwards, the calculation unit 14 reads the mapping table MT to obtain the numeral characters inputted by the user according to the relations recorded in the default character setting CharSet1, wherein the numeral characters sequentially inputted by the user are "2", "5", "8", "9".

However, before a user needs to input a password (a numeral string) using the keyboard 12, the calculation unit 14 receives a notification signal. After receiving the notification signal, the calculation unit 14 converts the default character setting CharSet1 into a specific character setting CharSet2 using a randomizing method and the specific character setting CharSet2 is presented to the user so that the user can input the password according to the specific character setting CharSet2 and not according to the default character setting CharSet1. Please note that in the present embodiment, the calculation unit 14 generates the specific character setting CharSet2 corresponding to the keyboard 12 using a randomizing method. Therefore, each time the default character setting CharSet1 is converted into a specific character setting CharSet2, the content of the generated specific character setting CharSet2 is different from before. However, in other embodiments, the calculation unit 14 can set the specific character setting CharSet2 corresponding to the keyboard 12 according to a self-defining function. Please refer to FIG. 3. FIG. 3 is a diagram of the mapping table MT according to the present invention. Assume the specific character setting CharSet2 generated at this time records that the scan codes 11h, 23h, d3h, 3dh, 74h, b1h, 5fh, 4eh, 88h, 9fh (the keys 30~39) respectively correspond to the numeral characters "8", "1", "4", "0", "7", "2", "6", "9", "5", "3". In other words, the calculation unit 14 records the specific character setting CharSet2 into the mapping table MT. The calculation unit 14 then reads the mapping table MT to set the keys 30~39 to correspond to inputs of the numeral characters "8", "1", "4", "0", "7", "2", "6", "9", "5", "3", respectively, according to the specific character setting CharSet2.

Figure 4:
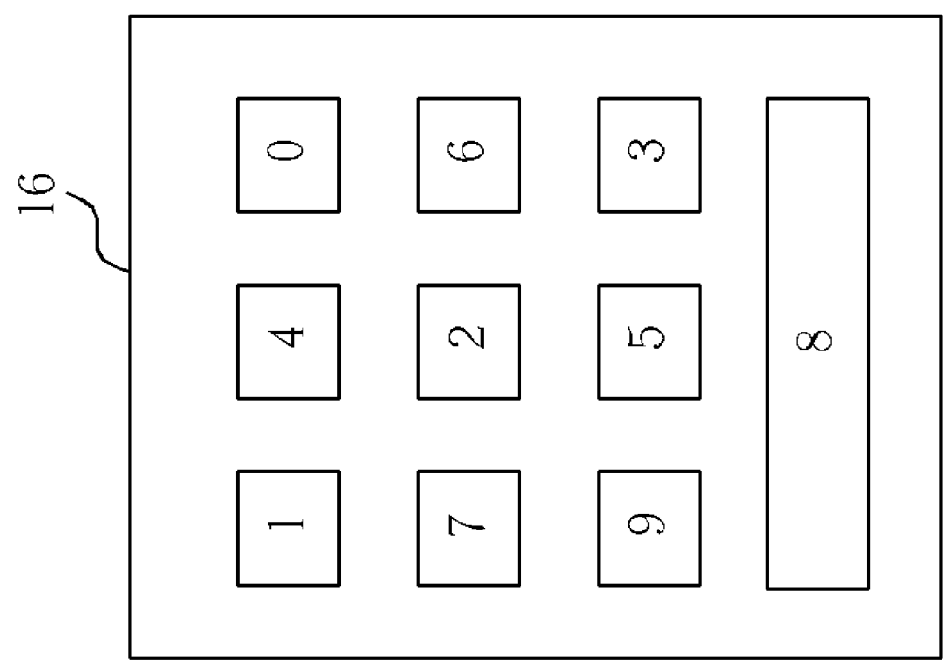
FIG. 4 is a diagram of a specific character setting according to the present invention.

The specific character setting CharSet2 can be presented to a user in several ways. Please refer to FIG. 4. FIG. 4 is a diagram of the specific character setting CharSet2 according to the present invention. The description of presenting the specific character setting CharSet2 is detailed in the following. In the present embodiment, the calculation unit 14 controls the display device 16 (i.e., a monitor) to display the specific character setting CharSet2. According to the specific character setting CharSet2, at present the key 35 is utilized for indicating an input of the numeral character "2"; and, according to the specific character setting CharSet2 displayed on the display device 16, a numeral character "2" displayed on the display device 16 corresponds to the key 35 of the keyboard 12. Hence, if a user now presses the key 35, the numeral character "2" (not the numeral character "5" according to the default character setting CharSet1) will be input into the calculation unit 14. Please note that as mentioned above, in the present invention, the keyboard 12 can be integrated with the display device 16; for example, each key 30~39 of the keyboard 12 comprises a small-sized liquid crystal display (LCD) on it for respectively displaying a corresponding numeral character; that means, the keys 30~39 can respectively display the numeral characters "8", "1", "4", "0", "7", "2", "6", "9", "5", "3" according to the specific character setting CharSet2. The above-mentioned keys with small-sized LCDs are also covered by the present invention.

At this time, if the user wants to input a numeral string "2", "5", "8", 9", the user needs to sequentially press the keys 35, 38, 30, 37 of the keyboard 12 according to the displayed specific character setting CharSet2. The calculation unit 14 then receives corresponding scan codes, b1h, 88h, 11h, 4eh, respectively corresponding to the keys 35, 38, 30, 37. Afterwards, the calculation unit 14 reads the mapping table MT and obtains the numeral characters, "2", "5", "8", "9", inputted by the user according to the specific character setting CharSet2. Even if a perpetrator has recorded the positions of the keys pressed by the user, the perpetrator can only know that the keys 35, 38, 30, 37 are pressed. In other words, the perpetrator will believe numeral characters "5", "8", "0", "7" displayed (printed) on the keys 35, 38, 30, 37 of the keyboard 12 are inputted by the user. In this way, the perpetrator cannot obtain the password (the numeral characters "2", "5", "18", "9") inputted by the user.

After the user has inputted the password, the process will return to a general situation in which the keys 30~39 respectively correspond to the numeral characters "0", "1", "2", "3", "4", "5", "6", "7", "8", "9" according to the default character setting CharSet1, and the calculation unit 14 sets the keyboard 12 to correspond to the default character setting CharSet1 according to the mapping table MT shown in FIG. 3; meaning the calculation unit 14 sets the keys 30~39 to indicate inputs of the numeral characters "0", "1", "2", "3", "4", "5", "6", "7", "8", "9" according to the default character setting CharSet1. For a description of the general situation in which the keyboard corresponds to the default character setting CharSet1, please refer to the above paragraphs.

The present invention provides a character input system capable of adjusting a character setting corresponding to an input device and a method thereof. The character input system and the method can be applied to an input device which prevents confidential data (i.e., passwords) from being leaked and is capable of replacing arrangements of keys or allowing users to define personal arrangements of the keys, such as a keyboard of an ATM or a burglarproof device. In the character input system, a calculation unit converts a default character setting into a specific character setting using a randomizing method. In this way, each time the default character setting is converted into a specific character setting, the content of the generated specific character setting is different from before. Therefore, when a user inputs a password, even if a perpetrator records the positions of keys pressed by the user, the perpetrator still cannot obtain the password inputted by the user. In addition, according to the present invention, the user is not required to carry out additional operations, such as memorizing an additional password. Furthermore, the character input system does not need any additional hardware devices to be added, so costs can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting a character setting of an input device, wherein the input device comprises a plurality of input components for entering a plurality of characters; the plurality of input components correspond to the plurality of characters respectively according to the character setting; and the method comprising:
   (a) setting a corresponding relation between the plurality of input components and the plurality of characters respectively according to a default character setting;
   (b) performing a character setting conversion to convert the default character setting into a specific character setting, wherein each time the default character setting is converted into the specific character setting, the corresponding relation under a currently converted specific character setting is different from the corresponding relation under a previously converted specific character setting;
   (c) resetting the corresponding relation between the plurality of input components and the plurality of characters respectively according to the specific character setting, wherein the plurality of input components corresponding to the plurality of characters under the default character setting are assigned to the same plurality of characters under the specific character setting which is different from the default character setting, and at least one of the input components corresponds to a first character before the character setting conversion is performed and corresponds to a second character different from the first character after the character setting conversion is performed; and
   (d) displaying the specific character setting, wherein the specific character setting includes the corresponding relation between the plurality of input components and the plurality of characters.

2. The method of claim 1, wherein step (d) comprises: displaying the specific character setting on a display device.

3. The method of claim 2, further comprising: integrating the input device with the display device, wherein each of the plurality of input components has a display for displaying a corresponding character.

4. The method of claim 1, wherein step (b) comprises: performing the character setting conversion to convert the default character setting into the specific character setting using a randomizing method.

5. The method of claim 1, wherein step (b) comprises: performing the character setting conversion to convert the default character setting into the specific character setting according to a self-defining function.

6. The method of claim 1, wherein step (b) further comprises: recording a mapping table for storing the default character setting and the specific character setting, and the method further comprises converting the character setting corresponding to the input device back into the default character setting according to the mapping table.

7. The method of claim 1, wherein the input device is a keyboard, each input component is a key, the plurality of input components correspond to a plurality of scan codes, the default character setting comprises a relation between the plurality of scan codes and the plurality of characters, and the specific character setting comprises another relation between the plurality of scan codes and the plurality of characters.

8. The method of claim 7, wherein the keyboard is utilized in an automatic teller machine (an ATM).

9. A character input system, comprising:
   an input device, comprising a plurality of input components, for entering a plurality of characters, wherein the plurality of input component correspond to the plurality of characters respectively according to a default character setting;
   a calculation unit, coupled to the input device, for performing a character setting conversion to convert the default character setting into a specific character setting, and resetting that the plurality of input component corresponds to the plurality of characters respectively according to the specific character setting, wherein each time the default character setting is converted into the specific character setting, the corresponding relation under a currently converted specific character setting is different from the corresponding relation under a previously converted specific character setting, the plurality of input components corresponding to a plurality of characters under the default character setting are assigned to the same plurality of characters under the specific character setting which is different from the default character setting, and at least one of the input components corresponds to a first character before the character setting conversion is performed by the calculation unit and corresponds to a second character different from the first character after the character setting conversion is performed by the calculation unit; and
   a display device, coupled to the calculation unit, for displaying the specific character setting, wherein the specific character setting includes the corresponding relation between the plurality of input components and the plurality of characters.

10. The character input system of claim 9, wherein the display device is integrated with the input device, and each of the plurality of input components has a display for displaying a corresponding character.

11. The character input system of claim 9, wherein the calculation unit performs the character setting conversion to convert the default character setting into the specific character setting using a randomizing method.

12. The character input system of claim 9, wherein the calculation unit performs the character setting conversion to convert the default character setting into the specific character setting according to a self-defining function.

13. The character input system of claim 9, further comprising:
   a storage unit for storing a mapping table utilized for storing the default character setting and the specific character setting;
   wherein the calculation unit further converts the character setting corresponding to the input device back into the default character setting according to the mapping table.

14. The character input system of claim 9, wherein the input device is a keyboard, each input component is a key, the plurality of input components correspond to a plurality of scan codes, the default character setting comprises a relation between the plurality of scan codes and the plurality of characters, and the specific character setting comprises another relation between the plurality of scan codes and the plurality of characters.

15. The character input system of claim 14, wherein the keyboard is utilized in an automatic teller machine (an ATM).

* * * * *